United States Patent [19]

Walsh

[11] Patent Number: 5,586,838
[45] Date of Patent: Dec. 24, 1996

[54] SEALED MARINE POST

[76] Inventor: Thomas M. Walsh, 53 LaFayette Ave., Suffern, N.Y. 10901

[21] Appl. No.: 453,399

[22] Filed: May 30, 1995

[51] Int. Cl.⁶ .......................... E02D 5/60; E04H 12/00; B65H 81/00; B32B 31/00
[52] U.S. Cl. .................. 405/216; 52/299; 52/301; 156/187; 156/188; 156/293; 405/255
[58] Field of Search .................... 405/216, 255; 52/263, 299, 301; 156/188, 187, 293

[56] References Cited

U.S. PATENT DOCUMENTS

| | | | |
|---|---|---|---|
| 869,336 | 10/1907 | Stewart | 405/255 X |
| 1,547,175 | 7/1925 | Lally | 52/301 |
| 2,664,977 | 1/1954 | Starcevich | 52/301 |
| 3,106,270 | 10/1963 | Lichty et al. | 52/301 |
| 4,161,090 | 7/1979 | Watts, Jr. | 52/301 |
| 5,326,410 | 7/1994 | Boyles | 405/216 X |

*Primary Examiner*—Michael Powell Buiz
*Assistant Examiner*—Tara L. Mayo

[57] ABSTRACT

A post for resisting deterioration within a body of water. The inventive device includes a central post member wrapped in a fiber mesh and sealed within a matrix resin. A glow in the dark or fluorescent painted mounting cap for facilitating coupling of the post to a pier structure and a guide cap for facilitating forced insertion of the post into a sea bed can also be provided.

3 Claims, 4 Drawing Sheets

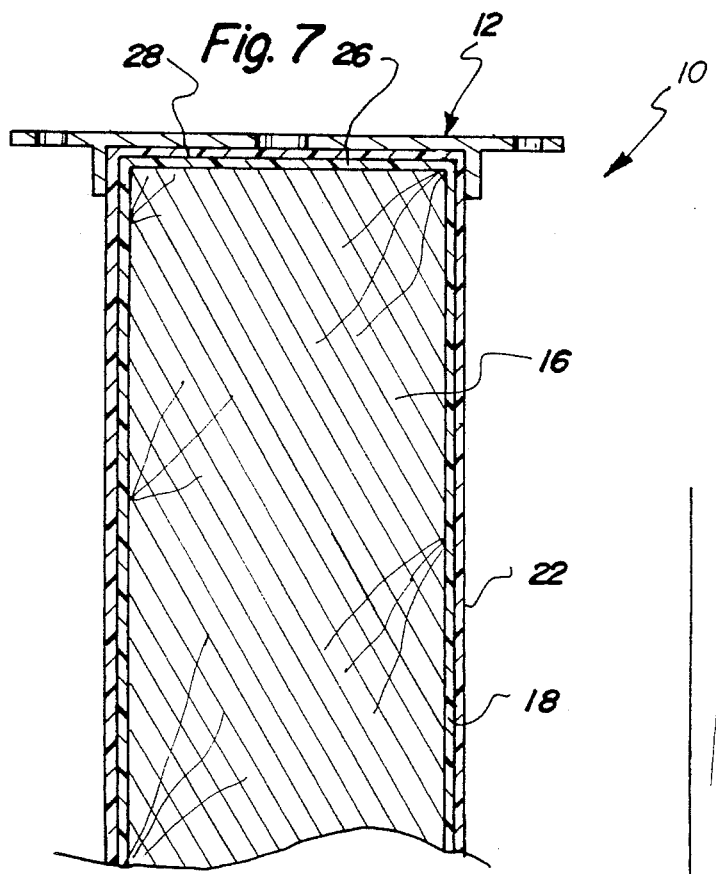
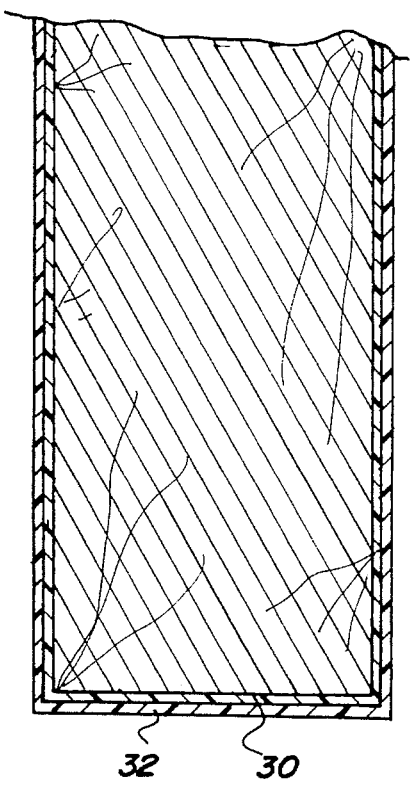
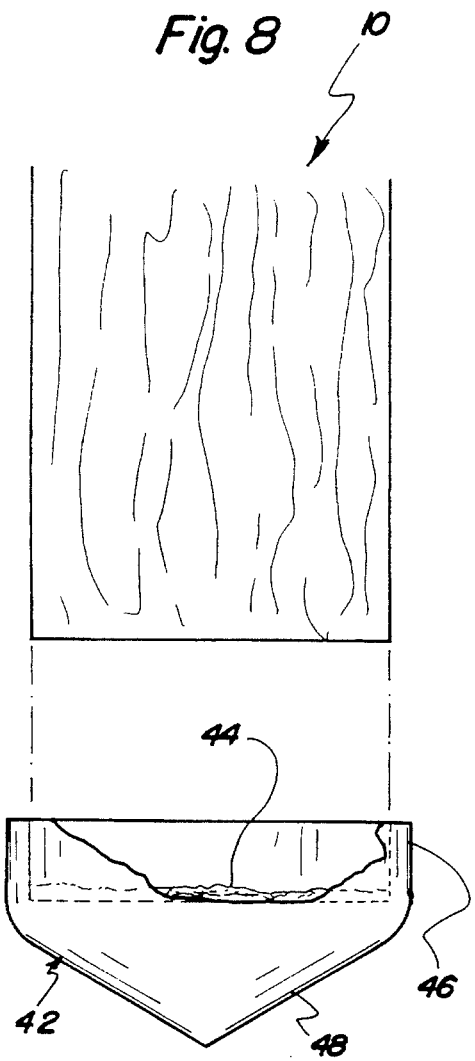
Fig. 7
Fig. 8

5,586,838

SEALED MARINE POST

BACKGROUND OF THE INVENTION

1. Field of the Invention

The present invention relates to column support structures and more particularly pertains to a sealed marine post for resisting deterioration within a body of water.

2. Description of the Prior Art

The use of column support structures is known in the prior art. More specifically, column support structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art column support structures include U.S. Pat. No. 3,467,490; U.S. Pat. No. 3,813,837; U.S. Pat. No. 3,969,557; U.S. Pat. No. 4,007,075; U.S. Pat. No. 4,262,047; and U.S. Pat. No. 4,584,210.

While these devices fulfill their respective, particular objectives and requirements, the aforementioned patents do not disclose a sealed marine post for resisting deterioration within a body of water which includes a central post member wrapped in a fiber mesh and sealed within a matrix resin, with a mounting cap for facilitating coupling of the post to a pier structure and a guide cap for facilitating forced insertion of the post into a sea bed.

In these respects, the sealed marine post according to the present invention substantially departs from the conventional concepts and designs of the prior art, and in so doing provides an apparatus primarily developed for the purpose of resisting deterioration within a body of water and supporting a pier or dock structure.

SUMMARY OF THE INVENTION

In view of the foregoing disadvantages inherent in the known types of column support structures now present in the prior art, the present invention provides a new sealed marine post construction wherein the same can be utilized for resisting deterioration within a body of water. As such, the general purpose of the present invention, which will be described subsequently in greater detail, is to provide a new sealed marine post apparatus and method which has many of the advantages of the column support structures mentioned heretofore and many novel features that result in a sealed marine post which is not anticipated, rendered obvious, suggested, or even implied by any of the prior art column support structures, either alone or in any combination thereof.

To attain this, the present invention generally comprises a post for resisting deterioration within a body of water. The inventive device includes a central post member wrapped in a fiber mesh and sealed with a matrix resin. A mounting cap for facilitating coupling of the post to a pier structure and a guide cap for facilitating forced insertion of the post into a sea bed can also be provided.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new sealed marine post apparatus and method which has many of the advantages of the column support structures mentioned heretofore and many novel features that result in a sealed marine post which is not anticipated, rendered obvious, suggested, or even implied by any of the prior art column support structures, either alone or in any combination thereof.

It is another object of the present invention to provide a new sealed marine post which may be easily and efficiently manufactured and marketed.

It is a further object of the present invention to provide a new sealed marine post which is of a durable and reliable construction.

An even further object of the present invention is to provide a new sealed marine post which is susceptible of a low cost of manufacture with regard to both materials and labor, and which accordingly is then susceptible of low prices of sale to the consuming public, thereby making such sealed marine posts economically available to the buying public.

Still yet another object of the present invention is to provide a new sealed marine post which provides in the apparatuses and methods of the prior art some of the advantages thereof, while simultaneously overcoming some of the disadvantages normally associated therewith.

Still another object of the present invention is to provide a new sealed marine post for resisting deterioration within a body of and supporting a dock or pier structure relative thereto.

Yet another object of the present invention is to provide a new sealed marine post which includes a central post member wrapped in a fiber mesh and sealed within a matrix resin, with a mounting cap for facilitating coupling of the post to a pier structure and a guide cap for facilitating forced insertion of the post into a sea bed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is a cross sectional view taken along line 7—7 of FIG. 2.

FIG. 8 is an exploded frontal elevation view of the invention including a guide means.

DESCRIPTION OF THE PREFERRED EMBODIMENT

Figure 1:
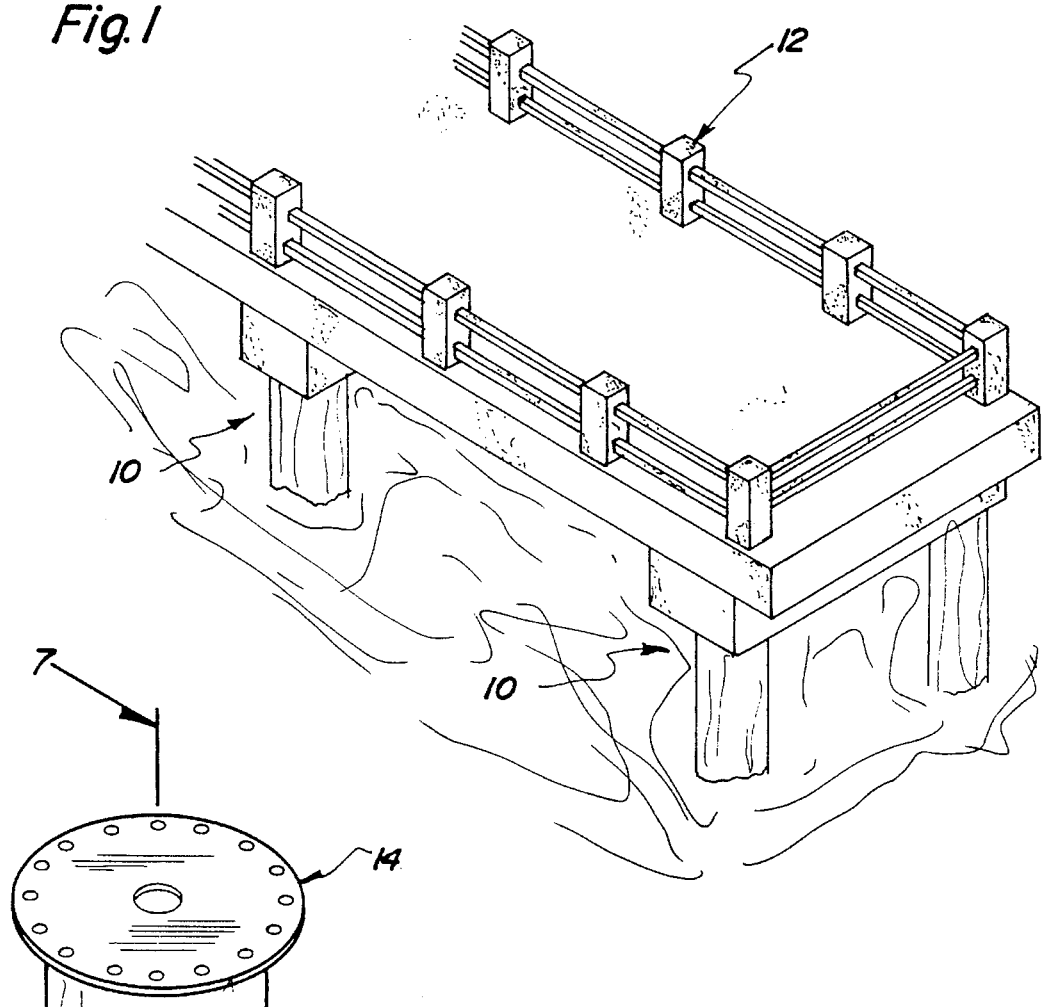
FIG. 1 is an isometric illustration of a plurality of sealed marine posts according to the present invention in use.

With reference now to the drawings, and in particular to FIGS 1–8 thereof, a new sealed marine post embodying the principles and concepts of the present invention and generally designated by the reference numeral 10 will be described.

More specifically, it will be noted that a plurality of the sealed marine posts 10 can be utilized to support a pier structure 12, as shown in FIG. 1 of the drawings. The sealed marine posts 10 are each configured to be inserted into a sea bed of a body of water so as to project above a water line thereof. A mounting means 'L' can be secured to a top end of each of the posts 10 to facilitate coupling of the sealed marine posts to a pier structure 12 or other structure to be supported relative to a body of water.

Figure 5:
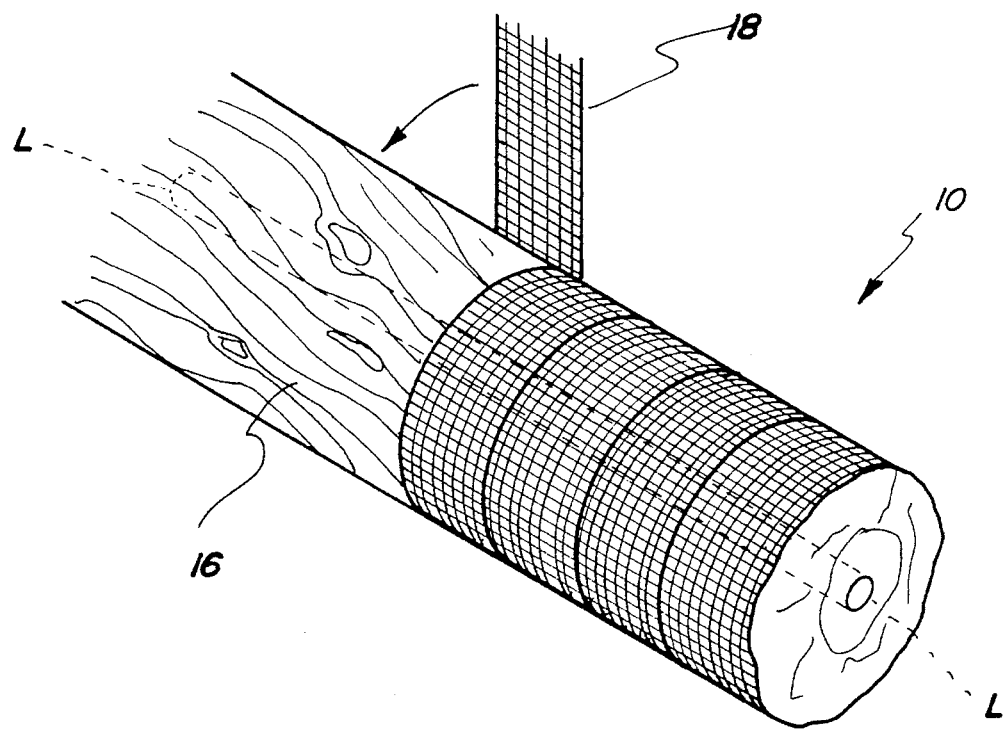
FIG. 5 is an isometric illustration of a construction of the present invention.
Figure 6:
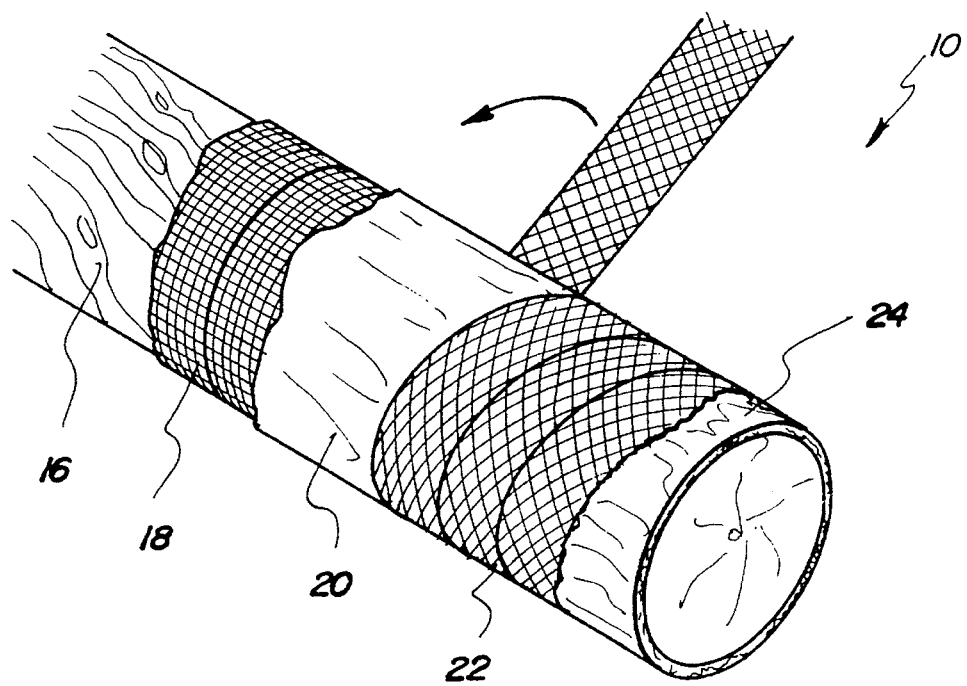
FIG. 6 is a further isometric illustration of the construction of the invention.

Referring now to FIGS. 5 through 7, it can be shown that the sealed marine post 10 of the present invention preferably comprises an elongated central post member 16 having a longitudinal axis 'L' directed therethrough. The central post member 16 is preferably comprised of wood, but may be alternatively comprised of tubular steel, aluminum, or other structures. The wooden central post member 16 can be treated with various anti-deterioration compounds including pressure applied CCA compounds conventionally known in the art. A first mesh layer 18 is wrapped about the central post member 16 and includes a plurality of orthogonally oriented fibers which extend parallel and orthogonal relative to the longitudinal axis 'L' of the central post member 16. A first matrix resin layer 20 impregnates the first mesh layer 18 and bonds with the central post member 16. A second mesh layer 22 is wrapped about the central post member 16 on top of the first matrix resin layer 20 as shown in FIG. 6 of the drawings. The second mesh layer 22 includes orthogonally oriented fibers which extend at an oblique angle relative to the longitudinal axis 'L' of the central post member 16 so as to impart further strength and rigidity to the central post member relative to the first mesh layer 18 as a result of the oblique angular orientation between the fibers of the first mesh layer 18 and the fibers of the second mesh layer 22. A second matrix resin layer 24 impregnates the second mesh layer 22 and bonds with the first matrix resin layer 20 thereof. If desired, the first and second mesh layers 18 and 22 can be wrapped on top of one another during manufacture of the device 10, wherein a single matrix resin layer is then applied to both mesh layers to simultaneously impregnate the same and bond with the central post member 16.

As shown in FIG. 7, the present invention 10 further comprises a first upper mesh panel 26 extending substantially orthogonally across an upper end of the central post member 16. The first upper mesh panel 26 is similarly impregnated with the first matrix resin layer 20 so as to seal the upper end of the central post member 16. A second upper mesh panel 28 can also extend across the upper end of the central post member on top of the first upper mesh panel 26 to be impregnated with the second matrix resin layer 24. Preferably, the first upper mesh panel 26 includes orthogonally oriented fibers, with the second upper mesh panel 28 including orthogonally oriented fibers which are positioned at an oblique angle relative to the fibers of the first upper mesh panel 26. In a similar manner, a first lower mesh panel 30 extends substantially orthogonally across a lower end of the central post member 16 and is impregnated with the first matrix resin layer 20. A second lower mesh panel 32 extends over the first lower mesh panel 30 and is impregnated with the second matrix resin layer 24. The first lower mesh panel 30 includes a plurality of orthogonally fibers which are positioned at an oblique angle relative to orthogonally oriented fibers of the second lower mesh panel 32. By this structure, the entire central post member 16 is encapsulated by the mesh layers 18 and 22 and sealed with the matrix resin layers 20 and 24 so as to preclude an entrance of sea water thereinto, thereby substantially extending a life of the central post member 16.

Figure 2:
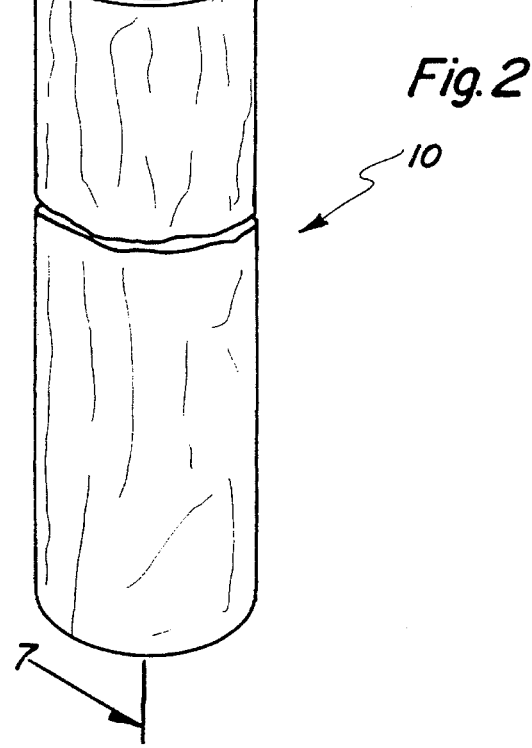
FIG. 2 is an isometric illustration of an individual post of the invention.
Figure 3:
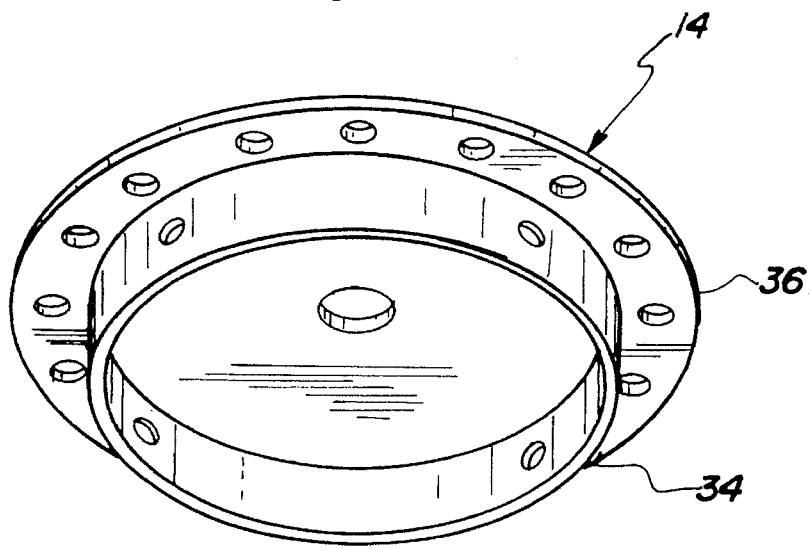
FIG. 3 is an isometric illustration of a mounting means comprising a portion of the invention.
Figure 4:
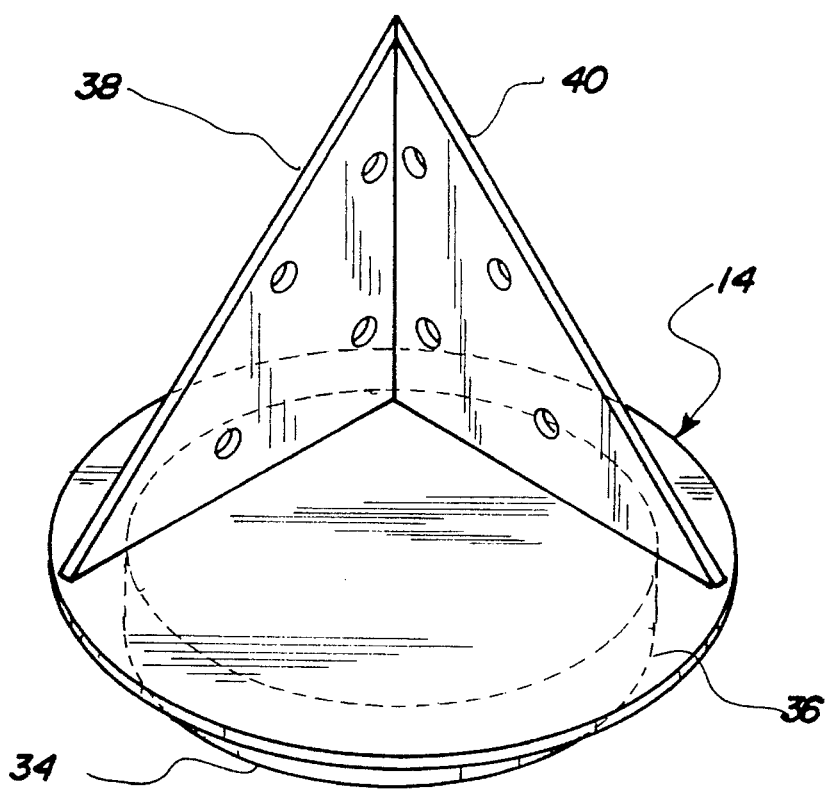
FIG. 4 is an isometric illustration of an alternative form of the mounting means.

Referring now to FIGS. 2 through 4, it can be shown that the mounting means 14 facilitating coupling of the post to a pier structure 12 preferably comprises a cylindrical receiver 34 which can be circumferentially positioned about the upper end of the central post 16 and over the mesh layers 18 and 22 thereof. A mounting plate 36 extends orthogonally across an upper end of the cylindrical receiver 34 and includes a plurality of unlabeled mounting apertures directed therethrough permitting securement of the mounting plate 36 to a lower portion of the pier structure 12. The cylindrical receiver 34 can be adhesively secured to the upper end of the central post member 16, or alternatively may include a plurality of mounting apertures directed therethrough permitting a passage of threaded fasteners (wrapped with the matrix resin fibers to seal such fasteners) or the like through the cylindrical receiver 34 for securement into the central post member 16. As shown in FIG. 4, the mounting means 14 may further comprise a first mounting flange 38 projecting substantially orthogonally from the mounting plate 36, and a second mounting flange 40 similarly projecting substantially orthogonally from the mounting plate. The mounting flanges 38 and 40 are preferably orthogonally oriented relative to one another so as to define a corner coupling which can be positioned at a juncture of two intersecting joists of the pier structure 12. By this structure, the mounting means 14 permits ease of coupling of the pier structure 12 to the individual posts 10 supporting the same as shown in FIG. 1 of the drawings.

Referring now to FIG. 8, it can be shown that the present invention 10 may further comprise a guide means 42 coupled to a lower end of the central post member 16 by an adhesive 44 as interposed therebetween for facilitating guiding of the post 10 during forced insertion thereof into a sea bed. To this end, the guide means 42 preferably comprises a lower cylindrical receiver 46 which can be circumferentially positioned about a lower end of the central post member 16 and the mesh layers 18 and 22 wrapped thereabout. A conical guide member 48 projects from the lower cylindrical receiver 46 and defines an unlabeled pointed end which can be forced into the sea bed during insertion of the post 10 thereinto so as to facilitate ease of such insertion.

In use, the sealed marine post 10 according to the present invention can be easily utilized to support a pier structure 12 as shown in FIG. 1 of the drawings. Because the central post member 16 is sealed beneath the mesh layers 18 and 22 and the resin layers 20 and 24, deterioration of the central post member 16 is substantially reduced and/or eliminated. Preferably, the mesh layers 18 and 22 comprise a fiberglass, with the matrix resin layers 20 and 24 comprising a conventionally known catalyzed resin.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A sealed marine post comprising:

an elongated central post member having a longitudinal axis directed therethrough;

a first mesh layer wrapped about the central post member and including a plurality of orthogonally oriented fibers which extend parallel and orthogonal relative to the longitudinal axis of said central post member;

a first matrix resin layer impregnated within said first mesh layer and bonded with said central post member;

a second mesh layer wrapped about said central post member on top of said first matrix resin layer, said second mesh layer including orthogonally oriented fibers which extend at an oblique angle relative to the longitudinal axis of said central post member;

a second matrix resin layer impregnated within said second mesh layer and bonded with said first matrix resin layer;

a first upper mesh panel extending substantially orthogonally across an upper end of the central post member in a plane substantially parallel to said upper end, said first upper mesh panel being impregnated with said first matrix resin layer so as to seal said upper end of said central post member;

a second upper mesh panel extending across the upper end of said central post member on top of said first upper mesh panel and being impregnated with said second matrix resin layer, said first upper mesh panel including orthogonally oriented fibers and said second upper mesh panel including orthogonally oriented fibers positioned at an oblique angle to the fibers of said first upper mesh panel;

a first lower mesh panel extending substantially orthogonally across a lower end of said central post member and being impregnated with the first matrix resin layer so as to seal the lower end of said central post member;

a second lower mesh panel extending across the lower end of said central post member on top of the first lower mesh panel, said second lower mesh panel being impregnated with the second matrix resin layer, said lower mesh panels each including orthogonally oriented fibers, said fibers of said second lower mesh panel being positioned at an oblique angle relative to the fibers of said first lower mesh panel;

and, a mounting means secured to a top end of the central post member for coupling the sealed marine post to a structure, said mounting means comprising a cylindrical receiver circumferentially positioned about and adhesively secured to the upper end of said central post member over said mesh layers and a mounting plate extending orthogonally across an upper end of said cylindrical receiver;

said mounting means further comprising a first mounting flange projecting substantially orthogonally from the mounting plate, and a second mounting flange projecting substantially orthogonally from the mounting plate, the mounting flanges being orthogonally oriented relative to one another so as to define a corner coupling which can be positioned at a juncture of two intersecting joists of a structure.

2. The sealed marine post of claim 1, and further comprising a guide means coupled to a lower end of the central post member for facilitating guiding of the post during forced insertion thereof into a sea bed.

3. The sealed marine post of claim 2, wherein the guide means comprises a lower cylindrical receiver circumferentially positioned about a lower end of the central post member; a conical guide member projecting from the lower cylindrical receiver and defining a pointed end which can be forced into a sea bed during insertion of the post thereinto.

\* \* \* \* \*